United States Patent

Koyama

[11] Patent Number: 5,898,460
[45] Date of Patent: Apr. 27, 1999

[54] SOLID-STATE IMAGING DEVICE

[75] Inventor: Eiji Koyama, Nara, Japan

[73] Assignee: Sharp Kabushiki Kaisha, Osaka, Japan

[21] Appl. No.: 08/701,838

[22] Filed: Aug. 23, 1996

[30] Foreign Application Priority Data

Oct. 26, 1995 [JP] Japan ................................. 7-279486

[51] Int. Cl.⁶ .............................. H04N 3/14; H04N 5/238
[52] U.S. Cl. ........................................... 348/296; 348/311
[58] Field of Search ................................... 348/296, 297, 348/298, 299, 311, 312, 362, 367, 363; 257/229, 230

[56] References Cited

U.S. PATENT DOCUMENTS

| 4,626,916 | 12/1986 | Mizoguchi et al. | 348/296 |
| 4,845,568 | 7/1989 | Hieda et al. | 348/314 |
| 5,025,319 | 6/1991 | Mutoh et al. | 348/296 |
| 5,606,366 | 2/1997 | Hieda et al. | 348/396 |
| 5,675,381 | 10/1997 | Hieda et al. | 348/297 |

OTHER PUBLICATIONS

T. Wakaki, et al., Japanese Laid–Open Patent Publication No. 5–103268, Laid open on Apr. 23, 1993.

Primary Examiner—Wendy Garber
Assistant Examiner—Luong Nguyen
Attorney, Agent, or Firm—David G. Conlin; William J. Daley, Jr.

[57] ABSTRACT

A solid-state imaging device of the present invention includes: a plurality of photodiodes arranged on a surface of a semiconductor substrate, for generating charges in response to light irradiation and for temporarily holding the charges; a charge transfer section for receiving the charges accumulated in each of the plurality of photodiodes in response to a read pulse supplied in a certain cycle and for transferring the charges in response to a transfer signal; and a shutter pulse application section for applying an electronic shutter pulse train, which allows the charges accumulated in each of the plurality of photodiodes to flow toward the substrate, onto the substrate, wherein the shutter pulse application section has a circuit for changing a pulse amplitude of the electronic shutter pulse train in the certain cycle.

10 Claims, 10 Drawing Sheets

SOLID-STATE IMAGING DEVICE

BACKGROUND OF THE INVENTION

1. Field of the Invention

The present invention relates to a solid-state imaging device which is applicable to camera systems such as video cameras, monitor cameras, door checker cameras, on-vehicle cameras, cameras for TV telephone and cameras for multimedia. In particular, the present invention relates to a solid-state imaging device such as a charge-coupled device, which contributes to reduction of voltage and power consumption of a camera system.

2. Description of the Related Art

At present, a generally used charge-coupled device (hereinafter, simply referred to as a CCD) has an electronic shutter function for controlling exposure time. The electronic shutter function is employed for controlling the exposure time without a mechanical exposure time control mechanism, which results in reduction in size, weight, cost and power consumption. In the CCD, electrical charges are generated by photoelectrical conversion and accumulated in photodiodes. The charges are transferred (read) from the photodiodes to a neighboring vertical CCD in response to a read pulse which is applied to transfer gates once for each field period.

In the case where the CCD does not have the electronic shutter function, the exposure time equals one field period determined by the interval between the read pulses, that is, 1/60 of a second in an NTSC system. On the other hand, in the case where the CCD has the electronic shutter function, all the electric charges, which are photoelectrically converted from light and then accumulated in the photodiodes, are allowed to flow (drain) toward an N-type substrate by applying an electronic shutter pulse to the N-type substrate. As a result, no charge is left in the photodiodes just prior to an exposure period. Then, the exposure period for the photoelectrical conversion process is started.

In such a case, the exposure time is equal to a time duration between the electronic shutter pulse and the read pulse. According to the electronic shutter function, the exposure time can be reduced to about 1/10000 of a second by controlling the timing of the application of the electronic shutter pulse.

Figure 7:
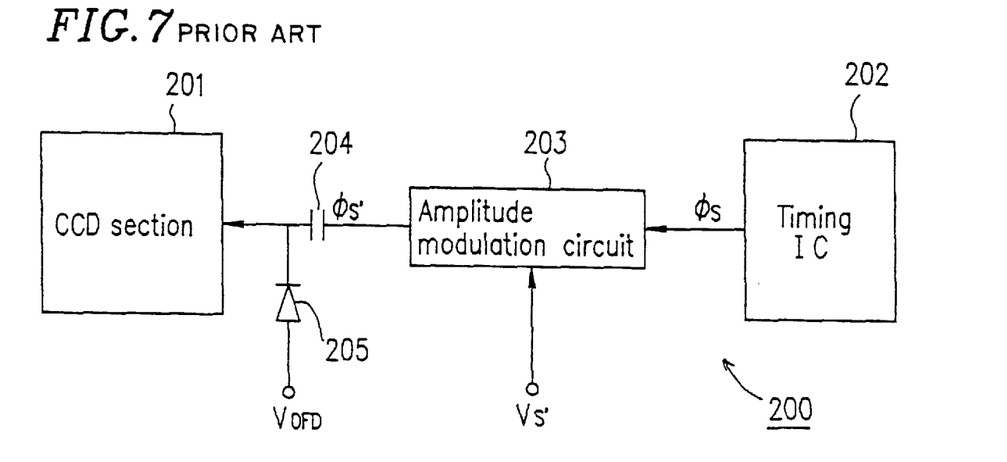
FIG. 7 is a block diagram showing an example of the system configuration of a conventional solid-state imaging device having an electronic shutter function.
Figure 8A:
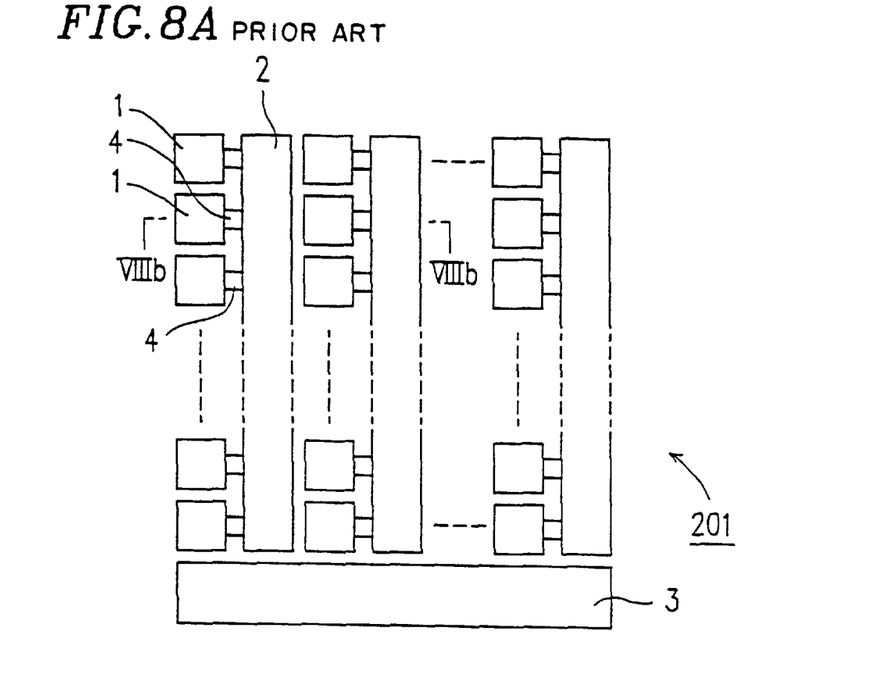
FIG. 8A is a plan view of the CCD section.
Figure 8B:
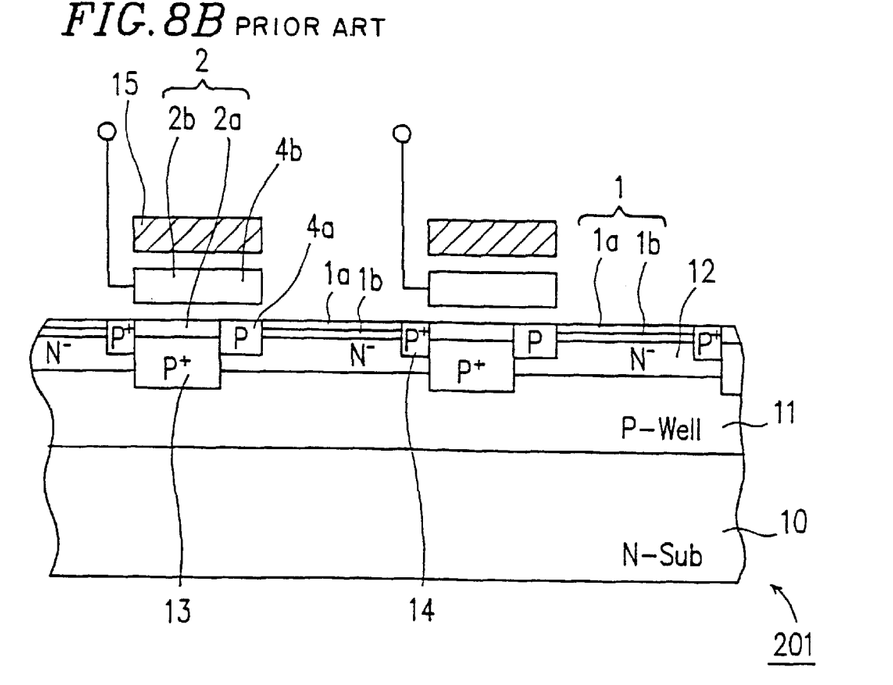
FIG. 8B is a cross-sectional view taken along a line VIIIb—VIIIb in FIG. 8A.

FIG. 7 shows an example of a system configuration of a conventional solid-state imaging device having the electronic shutter function. FIGS. 8A and 8B show the configuration of a CCD section of the solid-state imaging device. FIG. 8A is a plan view showing the CCD section; and FIG. 8B is a cross-sectional view taken along a line VIIIb—VIIIb in FIG. 8A.

As shown in FIG. 7, a conventional solid-state imaging device 200 includes a CCD section 201. The CCD section 201 receives a light beam reflected from an object and photoelectrically converts the light beam for each pixel, and transfers the charges generated by the photoelectrical conversion. As shown in FIGS. 8A and 8B, the CCD section 201 includes a plurality of photodiodes (light-receiving portions) 1 arranged on an N-type substrate 10 in a matrix manner, a plurality of vertical CCDs 2, and a horizontal CCD 3. The photodiodes 1 photoelectrically convert incident light into signal charges and store them. The vertical CCDs 2 vertically shift packets of the signal charges toward the horizontal CCD 3, and the horizontal CCD 3 horizontally transfers the signal charges to an output stage. Transfer gates 4 for transferring the charges accumulated in the photodiodes 1 to the vertical CCD 2 are provided between each of the photodiodes 1 and the corresponding vertical CCD 2.

A P-type well region 11 is formed on a surface of the N-type substrate 10. An N$^-$-type region 12 is formed on the surface of the P-type well region 11. The photodiode 1 includes a P$^+$-type region 1a and an N$^+$-type charge accumulating region 1b for accumulating the photoelectrically converted charges. The P$^+$-type region 1a is formed in the surface area of the N$^-$-type region 12. The N$^+$-type charge accumulating region 1b is formed in the surface area of the N$^-$-type region 12 below the P$^+$-type region 1a.

The vertical CCDs 2 are formed in the surface region of the N$^-$-type region 12 along lines of longitudinally arranged photodiodes. Each of the vertical CCDs 2 includes an N$^+$-type charge transfer region 2a, through which the charges are transferred, and a transfer electrode 2b. The transfer electrode 2b is formed on the charge transfer region 2a interposing an insulating film (not shown) therebetween. A P$^+$-type region 13 protruding into the P-type well region 11 is provided below the N$^+$-type charge transfer region 2a. A light-shielding film 15 is placed above the transfer electrode 2b.

A P-type read gate region 4a for reading out the charges accumulated in each of the photodiodes 1 to the vertical CCD 2 is formed between one end of the N$^+$-type charge accumulating region 1b of each of the photodiodes 1 and the N$^+$-type charge transfer region 2a. Part of a conductor layer constituting the vertical transfer gate 2b is positioned on the read gate region 4a, and serves as a read gate electrode 4b. A P$^+$-type region 14 is provided as a channel stopper portion between the other end of the N$^+$-type charge accumulating region 1b of each of the photodiodes 1 and the N$^+$-type charge transfer region 2a.

The solid-state imaging device includes a timing IC 202 and an pulse-amplitude modulation circuit 203 as shown in FIG. 7. The timing IC 202 generates a plurality of base pulses (or reference pulses) Φs for an electronic shutter (hereinafter, simply referred to as base pulses) for each constant repetitive cycle, in this case, for each field period. The pulse-amplitude—modulation circuit 203 changes an amplitude of the base pulse Φs based on a signal Vs so as to generate a shutter pulse Φs'. The shutter pulse Φs' output from the pulse-amplitude modulation circuit 203 is superimposed on a DC voltage $V_{OFD}$ for overflow control, and then is applied onto the N-type substrate 10 of the CCD section 201. The output of the pulse-amplitude modulation circuit 203 is connected to the substrate 10 of the CCD section 201 via a capacitor 204, while the DC voltage $V_{OFD}$ is applied onto the substrate 10 of the CCD section 201 via a diode 205.

In the solid-state imaging device 200 having the aforementioned configuration, a read pulse ΦR is applied to the read gate electrode 4b for each field period so that the charges accumulated in the photodiodes 1 are transferred to the vertical CCD 2. A plurality of shutter pulses Φs' are applied onto the substrate 10 for one field period so as to allow the charges accumulated in each of the photodiodes 1 to flow toward the substrate. The charges transferred to the vertical CCD 2 are externally output as imaging signals via the horizontal CCD 3.

Figure 9:
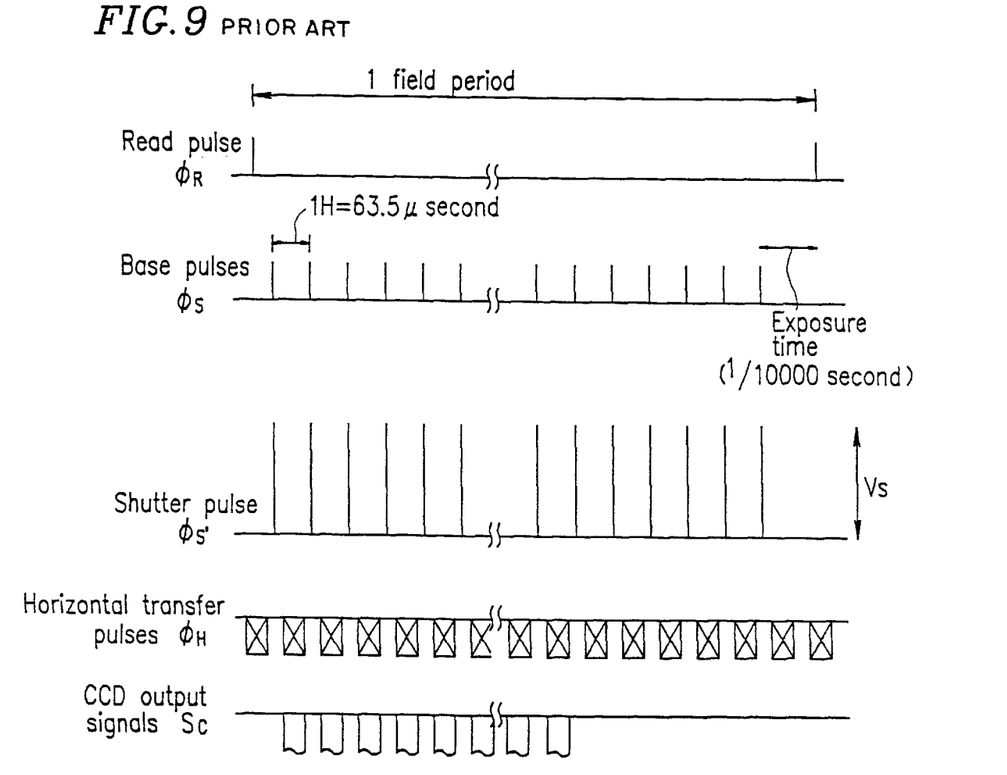
FIG. 9 is a timing chart showing the relationship between a read pulse ΦR, a shutter pulse Φs', a horizontal transfer pulse ΦH and a CCD output signal Sc in the conventional solid-state imaging device in the case where the exposure time is 1/10000 of a second.

FIG. 9 shows the timing relationship between the read pulse ΦR, the shutter pulse Φs', horizontal transfer pulses ΦH and CCD output signals Sc in the case where the exposure time is 1/10000 of a second.

As can be seen from FIG. 9, the base pulse Φs generated in the timing IC 202 is converted into the shutter pulse Φs' having an amplitude of Vs by the pulse-amplitude modulation circuit 203. Then, the shutter pulse Φs' superimposed on the DC voltage $V_{OFD}$ for overflow control is applied onto the substrate 10 of the CCD section 201.

Since such an electronic shutter operation allows all the charges accumulated in the photodiodes 1 to flow toward the N-type substrate 10 through the P-type well 11 positioned below the photodiodes 1, the shutter pulse Φs' should have an extremely large amplitude (for example, 22 V). When the pulse is applied, extremely large variation in potential occurs over the entire substrate. Therefore, the output signal of the CCD section 201 is adversely affected by the pulse. Accordingly, the shutter pulse Φs' is generally applied during a horizontal blanking period or a vertical blanking period in which no video signal is output from the CCD section 201, thereby preventing the output signal from being adversely affected Moreover, the electronic shutter operation as described above can theoretically control the exposure time with the final pulse along among a plurality of shutter pulses Φs' (hereinafter, also referred to as a shutter pulse train) applied to the substrate 10 of the CCD section 201 for one field period. The electronic shutter operation is usually performed for receiving bright illumination. Therefore, there is a possibility that excessive charges overflow or leak from the photodiodes 1 toward the vertical CCD 2 before the final pulse of the shutter pulses is applied to the substrate. In order to prevent the excessive charges from leaking, the shutter pulse is always applied in each of the horizontal blanking periods during one field period, that is, by the time when the final pulse is applied.

Figure 10A:
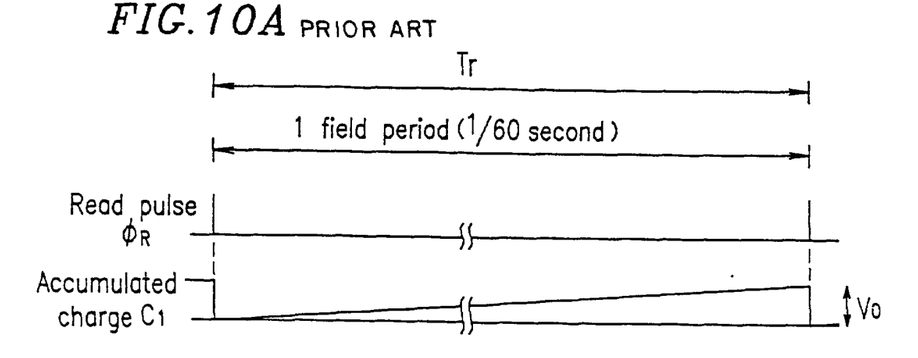
FIG. 10A corresponds to the case where an electronic shutter operation is not performed.
Figure 10B:
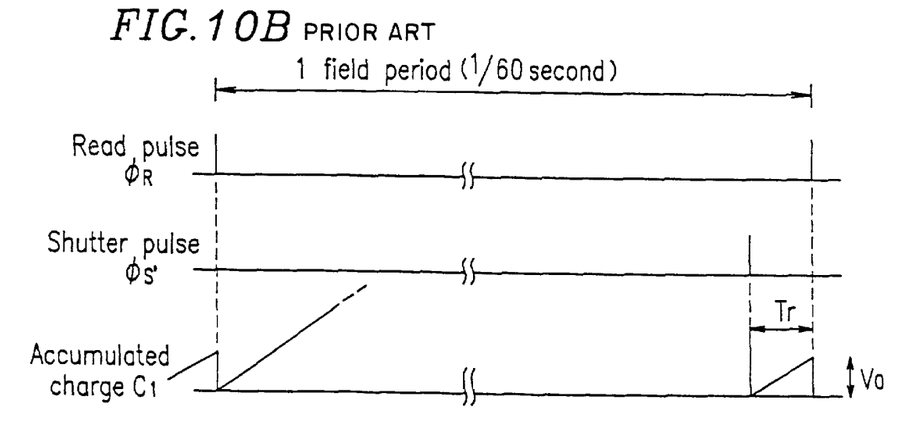
FIG. 10B corresponds to the case where only one shutter pulse is applied during one field period.
Figure 10C:
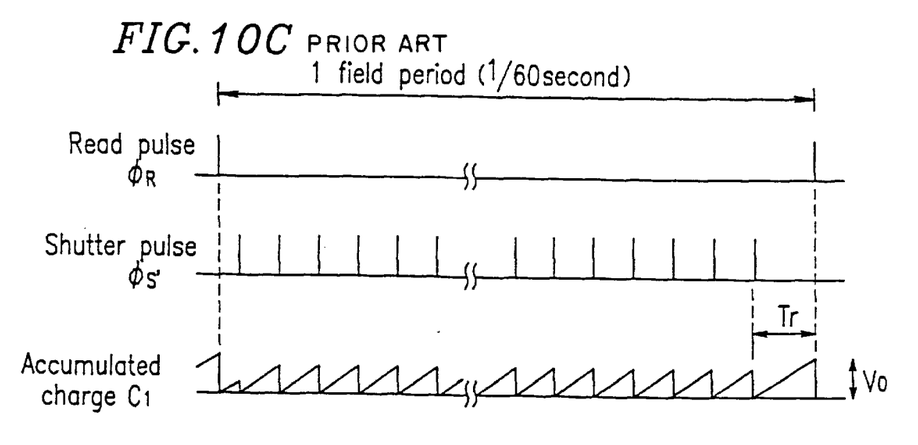
FIG. 10C corresponds to the case where a shutter pulse is always applied for each of the horizontal blanking periods during one field period.

FIGS. 10A to 10C are timing charts showing how the shutter pulse Φs' is applied and the amount of accumulated charges C1 for one field period in the photodiode for comparison. FIG. 10A corresponds to the case where the electronic shutter operation is not performed. In FIG. 10A, an output signal Vo corresponds to the charges accumulated in a predetermined photodiode 1 for 1/60 of a second of exposure time (i.e., one field period).

FIG. 10B corresponds to the case where only one shutter pulse is applied for one field period. In this case, the exposure time Tr is 1/10000 of a second. However, when the light is strong enough, the output signal Vo corresponding to the amount of charges read out from a certain photodiode 1 during one field period has the same level as that shown in FIG. 10A. In this case, however, if the amount of charges generated in the photodiode 1 during the time duration between the shutter pulse Φs' and the read pulse ΦR, exceeds a photodiode storage capacity (i.e., the amount of charges that the photodiode 1 can store), the excessive charges overflow from the photodiode 1 to the vertical CCD. As a result, the quality of picture is deteriorated.

FIG. 10C corresponds to the case where a shutter pulse is always applied for each horizontal blanking period during one field period even before the exposure is initiated. In such a case, since the charges generated in the photodiode 1 are caused to periodically flow toward the substrate even before the exposure is initiated, the charges generated in the photodiode 1 do not leak out to the vertical CCD.

Since the shutter pulse should have a large pulse amplitude, a high voltage is required to generate the shutter pulse. As the exposure time is shortened, the number of shutter pulses to be applied is increased. As a result, in the solid-state imaging device having a conventional electronic shutter function, the power consumption is disadvantageously increased. This is a very serious obstacle to realizing a camera for multimedia, an area in which it is particularly required to have reduced power consumption.

SUMMARY OF THE INVENTION

The solid-state imaging device of the present invention includes: a plurality of photodiodes arranged on a surface of a semiconductor substrate, for generating charges in response to light irradiation and for temporarily holding the charges; a charge transfer section for receiving the charges accumulated in each of the plurality of photodiodes in response to a read pulse supplied in a certain cycle and for transferring the charges in response to a transfer signal; and a shutter pulse application section for applying an electronic shutter pulse train, which allows the charges accumulated in each of the plurality of photodiodes to flow toward the substrate, onto the substrate, wherein the shutter pulse application section has a circuit for changing a pulse amplitude of the electronic shutter pulse train in the certain cycle.

In one embodiment of the invention, the electronic shutter pulse train includes a posterior pulse train including at least a final pulse and an anterior pulse train other than the posterior pulse train, and a pulse amplitude of the anterior pulse train is determined so as to be smaller than that of the posterior pulse train.

In another embodiment of the invention, the pulse amplitude of the posterior pulse train has such a level that almost all of the charges accumulated in each of the plurality of photodiodes are caused to flow toward the substrate, and wherein the pulse amplitude of the anterior pulse train has such a level that the charges accumulated in each of the plurality of photodiodes do not leak toward the charge transfer section.

In still another embodiment of the invention, a solid-state imaging device includes: a pulse generation circuit for generating a base pulse train having a certain amplitude at predetermined timing; and a signal processing circuit for receiving the base pulse train from the pulse generation circuit and for amplifying the base pulse train with at least two amplification factors to form the anterior pulse train and the posterior pulse train.

According to another aspect of the invention, a solid-state imaging device includes: a plurality of photodiodes arranged on a surface of a semiconductor substrate, for generating charges in response to light irradiation and for temporarily holding the charges; a charge transfer section for receiving the charges accumulated in each of the plurality of photodiodes in response to a read pulse supplied in a certain cycle and for transferring the charges in response to a transfer signal; and a shutter pulse application section for applying an electronic shutter pulse train, which allows the charges accumulated in each of the plurality of photodiodes to flow toward the substrate, onto the substrate, wherein the shutter pulse application section includes: a pulse generation circuit for generating a base pulse train having a certain amplitude at predetermined timing; a pulse separation circuit for receiving the base pulse train from the pulse generation circuit and for separating the base pulse train into a posterior pulse train including at least a final pulse and an anterior pulse train other than the posterior pulse train; an amplitude modulation circuit for receiving the posterior pulse train and the anterior pulse train output from the pulse separation circuit and for performing signal processing so that a pulse amplitude of the posterior pulse train is greater than that of the anterior pulse train and a pulse synthesizing circuit for combining the posterior pulse train and the anterior pulse train output from the amplitude modulation circuit, wherein an output of the pulse synthesizing circuit is applied onto the substrate as the electronic shutter pulse train.

In one embodiment of the invention, the amplitude modulation circuit modulates the pulse amplitude of the posterior pulse train to such a level that almost all of the charges accumulated in each of the plurality of photodiodes are allowed to flow toward the substrate, and modulates the pulse amplitude of the anterior pulse train to such a level that the charges accumulated in each of the plurality of photodiodes do not leak toward the charge transfer section.

In another embodiment of the invention, the amplitude modulation circuit includes a first amplification circuit for amplifying the pulse amplitude of the posterior pulse train to a certain level and a second amplification circuit for determining the pulse amplitude of the anterior pulse train for every certain cycle based on a control signal, wherein the solid-state imaging device further includes: a detection circuit for detecting the amount of charges overflowing from the photodiodes to the charge transfer section, based on a change in a level of an output signal of the charge transfer section; and a control signal generation circuit for generating the control signal based on an output of the detection circuit and for supplying the control signal to the second amplification circuit, thereby determining the pulse amplitude of the anterior pulse train so that the charges do not overflow from the photodiodes to the charge transfer section.

In still another embodiment of the invention, the amplitude modulation circuit includes an amplification circuit for selectively amplifying the pulse amplitude of the posterior pulse train, wherein the solid-state imaging device further includes: a detection circuit for detecting the amount of charges overflowing from the photodiodes to the charge transfer section, based on a change in a level of an output signal of the charge transfer section; and a separation region specifying circuit for generating a separation position specifying signal based on the output of the detection circuit, which specifies a boundary position between the anterior pulse train and the posterior pulse train so that the charges do not overflow from the photodiodes to the charge transfer section, and for supplying the separation position specifying signal to the pulse separation circuit.

In still another embodiment of the invention, the detection circuit includes: a storage circuit for storing a first signal and a second signal stored in the storage circuit, the first signal corresponding to the charges read out by a certain read pulse and the second signal corresponding to the charges read out by a read pulse subsequent to the certain read pulse; and a comparison circuit for comparing the first signal and the second signal stored in the storage circuit.

According to the present invention, as described above, according to the solid-state imaging device of the present invention, a shutter pulse train applied to the substrate so as to allow the charges accumulated in each photodiode to flow toward the substrate side is separated into an anterior pulse train and a posterior pulse train including the final pulse. The pulse amplitude of the anterior pulse train is determined so as to be smaller than that of the posterior pulse train. Thus, the increase in the power consumption due to the electronic shutter operation can be restrained while inhibiting the charges generated in the light-receiving portions from leaking toward the vertical CCD side.

Furthermore, the amplitude level of pulses included in the posterior pulse train is set at such a level that all the charges accumulated in the photodiode are made to flow toward the substrate side. Therefore, the accumulation of the charges to be read out can be started while no charge remains in all of the photodiodes. As a result, the quality of image is prevented from being deteriorated due to variation in a charge storage capacity of a photodiode.

The amplitude level of the pulses of the anterior pulse train are set at such a level that the charges accumulated in the photodiode do not leak toward the charge transfer section. Therefore, the power consumption due to the electronic shutter operation can be most effectively reduced while certainly preventing the charges generated in the light-receiving portions from leaking toward the vertical CCD.

According to the present invention, since the pulse amplitude of the anterior pulse train output from the pulse separation circuit is not amplified, an pulse-amplitude modulation circuit for the anterior pulse train and a power source for amplitude conversion are not required. Moreover, the amount of charges leaking from the photodiode toward the charge transfer section is detected. Based on the output of the result of detection, the position of a boundary, at which the shutter pulse train is separated into the anterior pulse train and the posterior pulse train, is specified. Therefore, even if the amount of incident light from a subject is increased or decreased, the charges are substantially prevented from leaking from the photodiode toward the charge transfer section.

Thus, the invention described herein makes possible the advantage of providing a solid-state imaging device capable of preventing the charges generated in a photodiode from leaking out toward a vertical CCD and reducing the power consumption while restraining the power consumption from being increased by the electronic shutter operation.

This and other advantages of the present invention will become apparent to those skilled in the art upon reading and understanding the following detailed description with standard to the accompanying figures.

BRIEF DESCRIPTION OF THE DRAWINGS

FIGS. 1A and 1B are diagrams showing the configuration of a solid-state imaging device of Example 1 according to the present invention.

FIGS. 4A and 4B are views for illustrating a solid-state imaging device of Example 2 according to the present invention.

FIGS. 5A and 5B are block diagrams for illustrating a solid-state imaging device of Example 3 according to the present invention.

FIGS. 8A and 8B are views showing the configuration of a CCD section in the conventional solid-state imaging device.

FIGS. 10A to 10C are timing charts showing how the shutter pulse Φs' is applied and the charge accumulation in a photodiode for one field period in the conventional solid-state imaging device for comparison.

DESCRIPTION OF THE PREFERRED EMBODIMENTS

Hereinafter, the present invention will be described by way of illustrative examples.

EXAMPLE 1

Figure 1A:
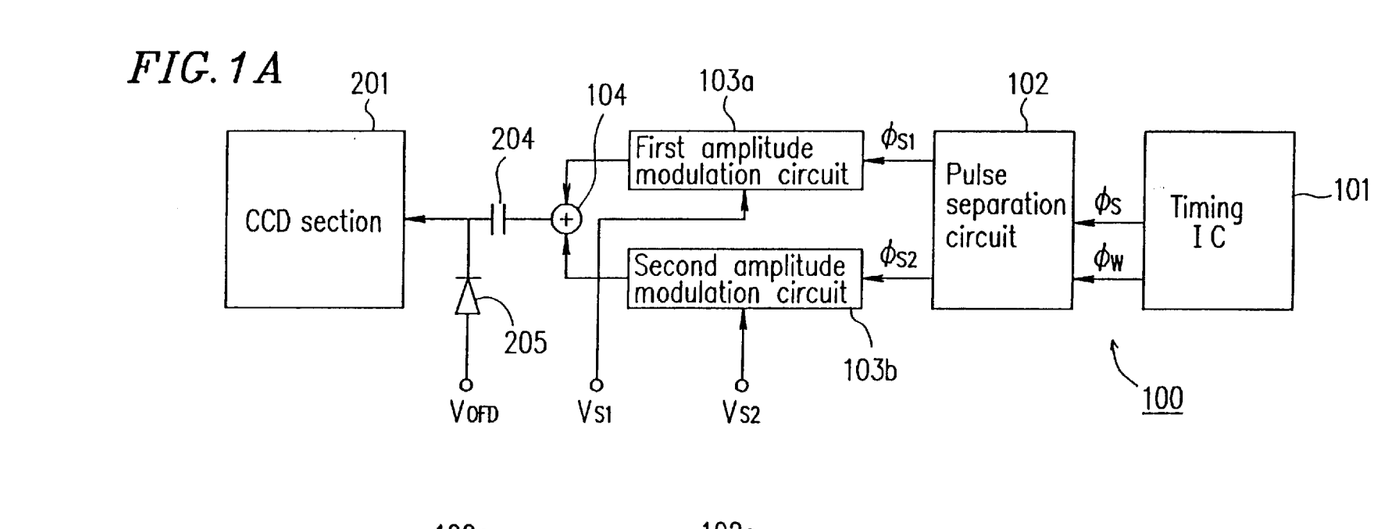
FIG. 1A is a block diagram showing the entire configuration of the solid-state imaging device.
Figure 1B:
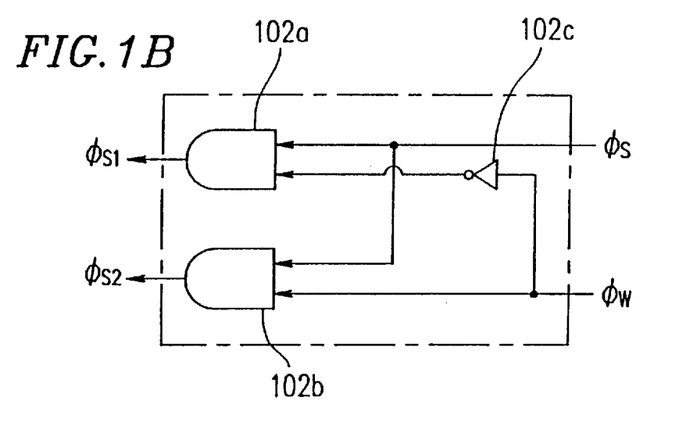
FIG. 1B is a diagram showing the detailed configuration of a pulse separation circuit in the solid-state imaging device.

FIGS. 1A and 1B show the configuration of a solid-state imaging device of Example 1 according to the present invention. FIG. 1A is a block diagram showing the configuration of the solid-state imaging device; and FIG. 1B is diagram showing the detailed configuration of a pulse separation circuit 102 in the solid-state imaging device.

In FIGS. 1A and 1B, the same components as those of the conventional solid-state imaging device 200 shown in FIG. 7 are denoted by the same reference numerals for simplification. A solid-state imaging device 100 of Example 1 includes a timing IC 101, a pulse separation circuit 102, a first pulse-amplitude modulation circuit 103a and a second pulse-amplitude modulation circuit 103b.

The timing IC 101 generates a periodic base pulse train Φs for controlling the timing of the electronic shutter operation, and a window pulse Φw for separating the base pulse train Φs for each field period, that is, a period from the generation of a read pulse to the generation of a next read pulse. The pulse separation circuit 102 separates the base pulse train Φs into a final pulse Φs1 and the remaining anterior pulse train Φ2 based on the window pulse Φw. The first pulse-amplitude modulation circuit 103a amplifies the amplitude of the final base pulse Φs1, while the second pulse-amplitude modulation circuit 103b amplifies the amplitude of the anterior base pulse train Φs2.

The pulse separation circuit 102 includes a first AND circuit 102a having two input-ports, a second AND circuit 102b having two input-ports and an inverter circuit 102c for inverting the window pulse Φw. One input-port of each of the first AND circuit 102a and the second AND circuit 102b receives the base pulse train Φs. The output of the inverter circuit 102c is supplied to the other input-port of the first AND circuit 102a, while the window pulse Φw is supplied to the other input-port of the second AND circuit 102b. Then, the final base pulse Φs1 is output from the first AND circuit 102a, while the anterior base pulse train Φs2 is output from the second AND circuit 102b.

Voltages having different potential levels $V_{s1}$ and $V_{s2}$ are respectively supplied to the first and second pulse-amplitude modulation circuits 103a and 103b as power. In the first pulse-amplitude modulation circuit 103a, the final base pulse Φs1 is amplified so that its pulse amplitude level becomes the potential level $V_{s1}$. As a result, the final base pulse Φs1 becomes a final shutter pulse Φs1' which is to be applied to the substrate of the CCD section 201. In the second pulse-amplitude modulation circuit 103b, the anterior base pulse train Φs2 is amplified so that its pulse amplitude becomes the potential level $V_{s2}$. As a result, the anterior base pulse Φs2 becomes an anterior shutter pulse train Φs2 which is to be applied to the substrate of the CCD section 201.

The solid-state imaging device 100 further includes a pulse synthesizer 104 for synthesizing the final shutter pulse Φs1' and the anterior shutter pulse train Φs2'. A resultant composite shutter pulse train Φs' is superimposed on a DC voltage $V_{OFD}$ for overflow control, and then is applied to the substrate 10 of the CCD section 201 (see FIG. 8B).

The base pulse train Φs for electronic shutter and the window pulse Φw are first generated from the timing IC 101, and then are input to the pulse separation circuit 102. The pulse separation circuit 102 separates the pulse train Φs for electronic shutter into the final pulse (the final base pulse) Φs1 for electronic shutter and the remaining pulse train (the anterior base pulse train) Φs2. At this time, the pulse amplitude of the pulse train for electronic shutter output from the timing IC 101 is at the same level as that of a power supply voltage (e.g., 5 V) of the timing IC 101.

The amplitude of the final base pulse Φs1 is amplified through the first pulse-amplitude modulation circuit 103a while the amplitude of the anterior base pulse train Φs2 is amplified through the second pulse-amplitude modulation circuit 103b. Respectively different power supply voltages $V_{s1}$ and $V_{s2}$ are supplied to the first and second pulse-amplitude modulation circuits 103a and 103b. As a result, the final shutter pulse Φs1' and the anterior shutter pulse train Φs2' are obtained, respectively. Then, the final shutter pulse Φs1' and the anterior shutter pulse train Φs2' are combined in the pulse synthesizer 104 so as to form the composite shutter pulse train Φs', which is in turn supplied to the substrate of the CCD section 201 via the capacitor 204. At this time, the DC voltage $V_{OFD}$ for overflow control is supplied to the substrate of the CCD section 201 via the diode 205, while the composite shutter pulse train Φs' superimposed on the DC voltage $V_{OFD}$ is applied to the substrate of the CCD section 201.

Figure 2:
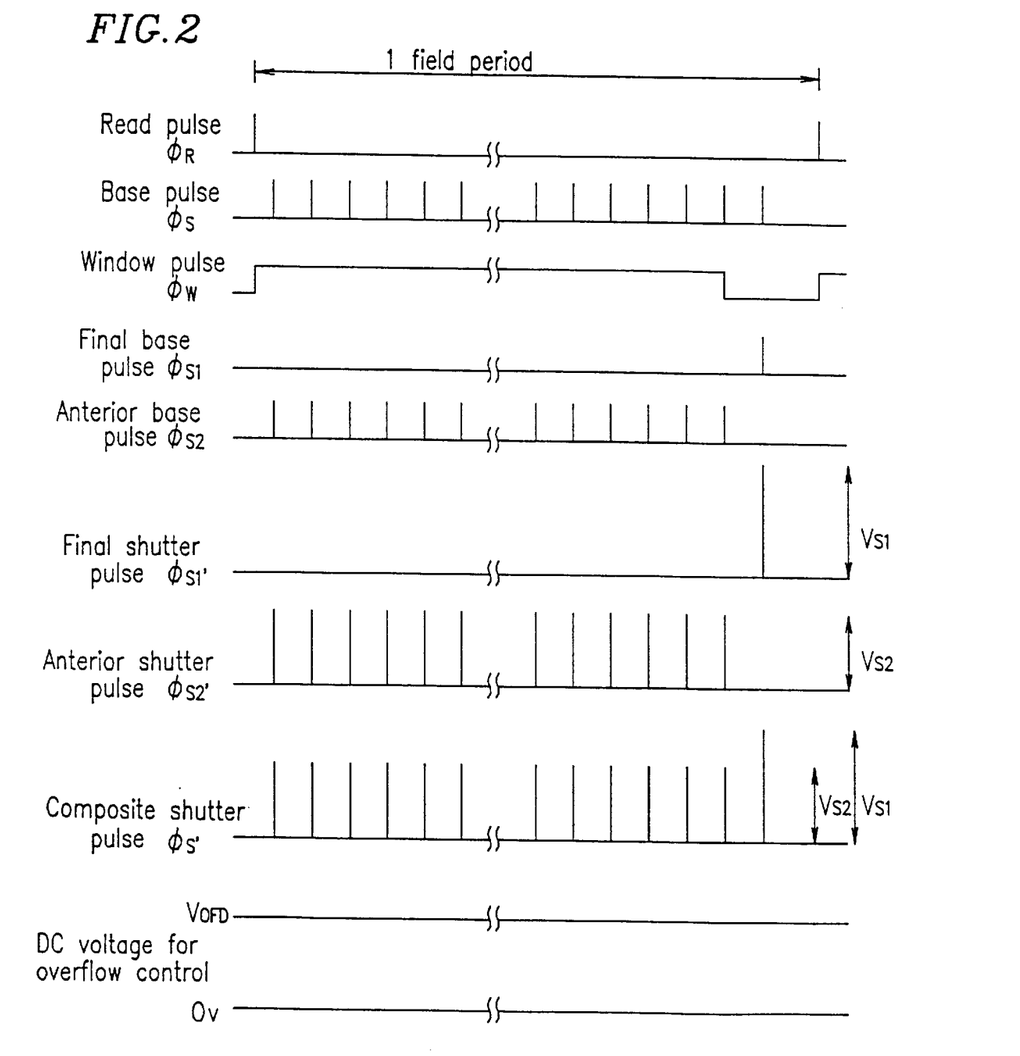
FIG. 2 is a timing chart showing a waveform for illustrating the operation of the solid-state imaging device of Example 1 according to the present invention.

FIG. 2 shows a timing waveform of each of the pulses described above. The amplitude level $V_{s1}$ of the final shutter pulse Φs1' is the same as the amplitude level of the shutter pulse of a conventional system. However, the amplitude level $V_{s2}$ of the anterior shutter pulse train Φs2' applied prior to the final shutter pulse Φs2' within one field is determined so as to be lower than the amplitude level $V_{s1}$ of the final shutter pulse Φs1'. In Example 1, the amplitude level $V_{s1}$ of the final shutter pulse Φs1' is set at such a value that all the charges accumulated in the photodiode 1 are caused to flow toward the substrate of the CCD section 201. The amplitude level $V_{s2}$ of the formed shutter pulse train Φs2' is set at such a value that the charges accumulated in the photodiode 1 do not leak out toward a charge transfer section in one field period.

In FIG. 2, only the final shutter pulse Φs2' is set at a high voltage level. Arbitrary pulses among the other shutter pulses may also be set at a high voltage level along with the final shutter pulse. In such a case, the amount of leaking charges can be further reduced.

In the conventional pulse train for electronic shutter, not only the pulse amplitude of the final shutter pulse within one field period but also the pulse amplitude of the anterior shutter pulse train are set at a high voltage level, i.e., 22 V. In short, the amplitudes of all the pulse train for electronic shutter are set at a high voltage level.

However, the pulses of the anterior shutter pulse train Φs2' except the final shutter pulse Φs1' do not always require the same amplitude as that of the final shutter pulse Φs1'. The sufficient result can be obtained even if the pulses of the anterior shutter pulse train Φs2' are set at a voltage level lower than that of the final shutter pulse. This shows that almost all of the pulses of the shutter pulse train Φs' in one field can be set at the amplitude level $V_{s2}$ lower than the amplitude level $V_{s1}$ of the final shutter pulse Φs1'. Thus, the voltage of the pulses used for the electronic shutter operation can be lowered, resulting in reduction of the power consumption.

For example, when it is assumed that about 250 horizontal synchronizing signals are supplied during one field period, about 250 shutter pulses are applied since the shutter pulses are applied synchronous with the horizontal synchronizing signals. It is sufficient to set only a few shutter pulses at a high level, including the final stage. Therefore, it greatly contributes to reduction in the power consumption as a system.

Figure 3:
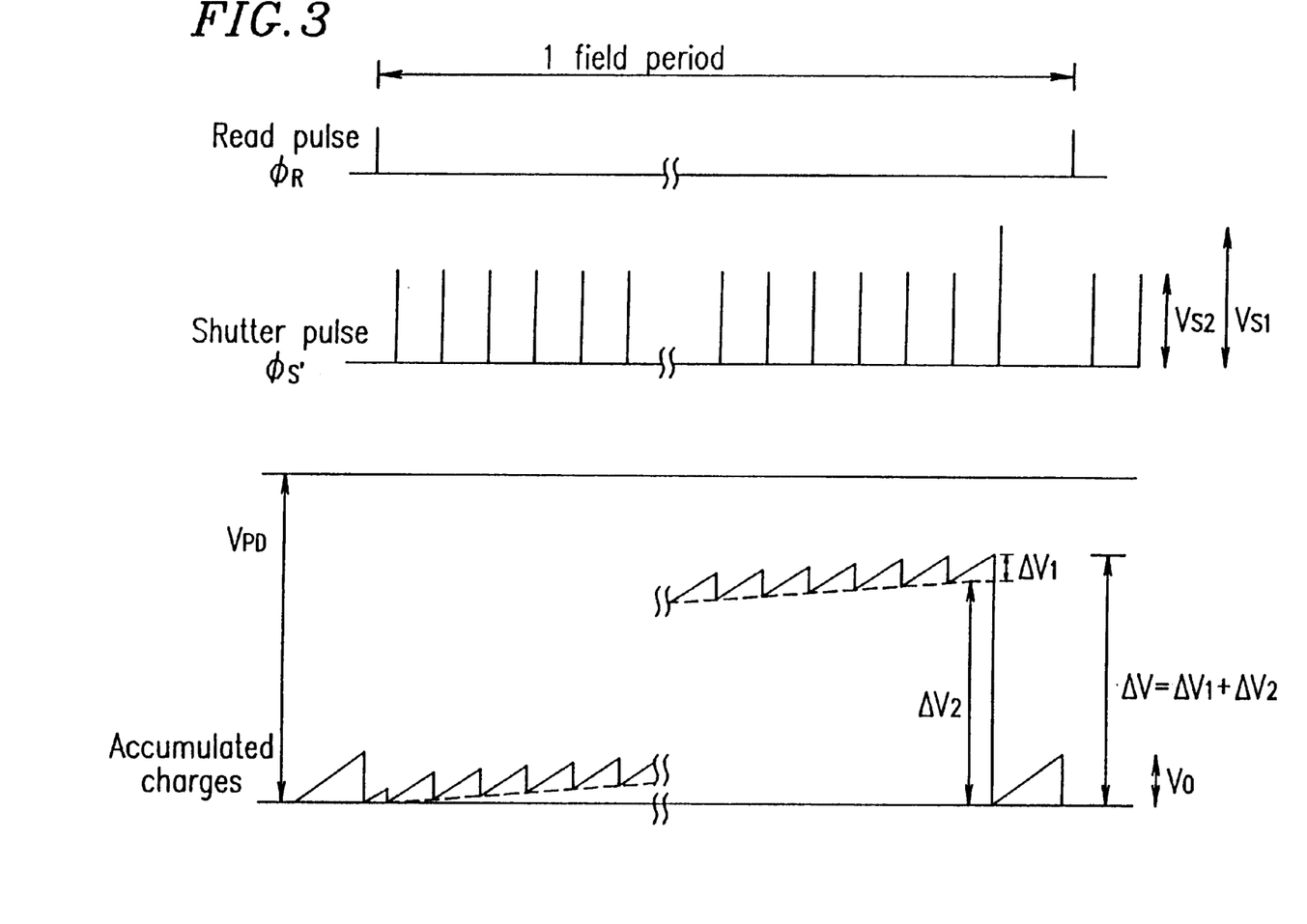
FIG. 3 is a timing chart showing how charges are accumulated in a photodiode of the solid-state imaging device of Example 1 according to the present invention.

FIG. 3 shows how the charges are accumulated in the photodiode in the solid-state imaging device of Example 1.

In Example 1, the pulse amplitude level $V_{s2}$ of the anterior shutter pulse train $Φs2^1$ is set at a lower level than the amplitude level $V_{s1}$ of the final shutter pulse Φs1'. Therefore, since the charges accumulated in the photodiode 1 are not completely caused to flow in each horizontal period, part of charges remain. If the total amount (=ΔV) of the remaining charge for one field period is smaller than the photodiode storage capacity of the CCD section 201, that is, the maximum amount of charges $V_{PD}$ which can be accumulated in the photodiode, the charges do not leak out from the photodiode toward the vertical CCD transfer section. This is because the pulse amplitude of the final shutter pulse Φs1' is set at such a value that all the charges accumulated in the photodiode 1 are caused to flow toward the substrate of the CCD section 201.

Herein, ΔV=ΔV1+ΔV2 is satisfied, where ΔV1 is the amount of charges accumulated for one horizontal period and is proportional to the amount of light and the sensitivity of the CCD, and ΔV2 is the total amount of remaining charges for one field period.

An optimal value of the amplitude level $V_{s2}$ of the anterior shutter pulse train Φs2' is determined based on the photodiode characteristics and sensitivity of the CCD section 201 or the amount of incident light travelling from a subject being imaged. More specifically, in FIG. 3, a value of $V_{PD}$ is determined based on a capacitance of the photodiode, a value of ΔV1 is determined based on the amount of received light when the subject is imaged and the photosensitivity of the CCD section, and a value of ΔV2 is determined based on the amplitude level $V_{s2}$ of the anterior shutter pulse train Φs2'.

Thus, the value of the amplitude level $V_{s2}$ is individually set in consideration of the purpose of a camera.

For example, in Example 1, the amplitude level $V_{s2}$ of the anterior shutter pulse train Φs2' is set at such a value that the charges accumulated in the photodiode for one field period are not leaked out toward the charge transfer section. Thus, even from the time when the charges accumulated in the photodiode are transferred to the vertical CCD by a read pulse to the time when a final shutter pulse Φs1' is applied to the substrate of the CCD section 201, the charges do not leak from the photodiode to the vertical CCD section.

In the solid-state imaging device of Example 1 having the aforementioned configuration, an optimal value of the pulse amplitude $V_{s2}$ depends on the photodiode characteristics and the amount of light being imaged. However, about 5 V of the amplitude $V_{s2}$ substantially produces sufficient results. The power consumption in this case will be compared. The photodiode characteristics include a γ value and a photodiode storage capacity. The γ value will be briefly described. The linear relationship between the amount of light received by the photodiode and a value of the output is linearly held until the amount of light reaches a certain level. When the amount of light exceeds the certain level, the relationship between the amount of received light and a value of the output is such that the output value is in proportion to γth power of the amount of light. The exponent γ is one parameter which defines the photodiode characteristics.

The power consumption when a capacitor is charged/discharged is generally expressed by $CV^2f$, where C is a capacitance (F), i.e., a junction capacitance between the N-type substrate 10 and the P-type well region 11 shown in FIG. 8B, V is a pulse amplitude (V), and f is a pulse frequency (Hz).

In the solid-state imaging device using ⅓ type CCD including a pixel region having a diagonal length of ⅓ inch, when the electronic shutter operation with the exposure time of ¹/₁₀₀₀₀ of a second is performed by the shutter pulse having a pulse amplitude of 22 V, the power consumption for one second is 3.8 (mW) as is calculated by the following Equation.

$$500\ (pF) \times 22\ (V)^2 \times 15.73\ (kHz) = 3.8\ (mW)$$

In this case, the junction capacitance C between the N-type substrate and the P-type well is assumed to be 500 (pF).

On the other hand, if the final shutter pulse Φs1' has the pulse amplitude $V_{s1}$ of 22 (V) and the anterior shutter pulse train Φs2' has the pulse amplitude $V_{s2}$ of 5 (V), the power consumption for one second is 0.2 (mW) as is calculated by the following Equation. Accordingly, the power consumption is remarkably reduced.

$$500\ (pF) \times [22\ (V)^2 \times 60\ (Hz) + 5\ (V)^2 \times 15.73\ (kHz)] = 0.2\ (mW)$$

These high voltages for shutter are obtained by boosting the voltage of a single external power source, for example, 5 V, since a CCD imaging device is loaded in portable equipment. Thus, the use of the present invention greatly contributes to the reduction of power consumption as a total system.

As described above, in Example 1, the shutter pulse train, which is applied onto the substrate so as to allow the charges accumulated in each of the photodiodes 1 to flow toward the substrate, is separated into the anterior shutter pulse train Φs2' and the final shutter pulse Φs1'. Since the anterior shutter pulse train Φs2' has a pulse amplitude smaller than that of the final shutter pulse Φs1', the increase in the power consumption due to the electronic shutter operation can be restrained while preventing the charges generated in the photodiode from leaking out toward the vertical CCDs 2.

EXAMPLE 2

Figures 4A, 4B:
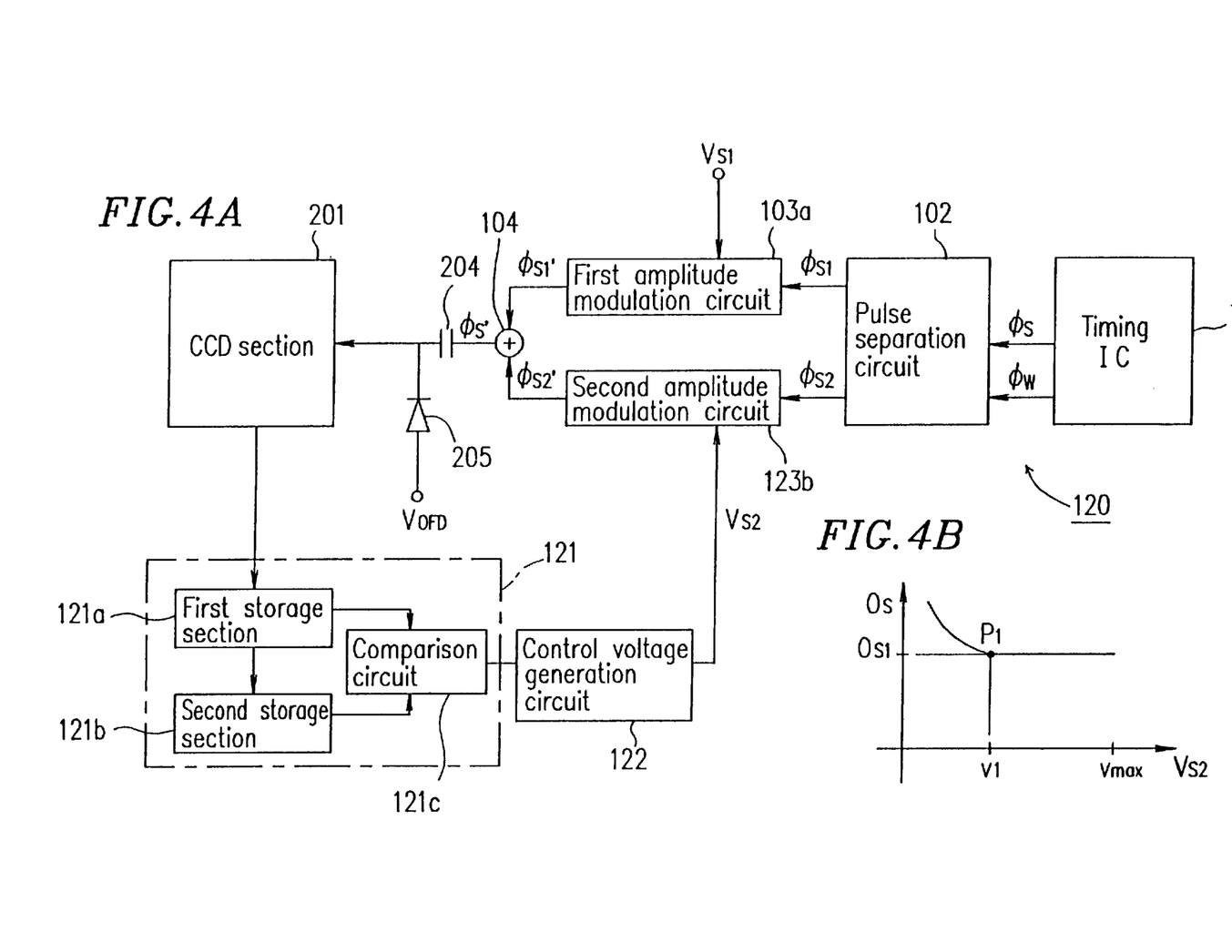
FIG. 4A is a block diagram showing the configuration of the solid-state imaging device of Example 2.
FIG. 4B is a graph showing a waveform for illustrating the operation of the solid-state imaging device.

FIGS. 4A and 4B illustrate a solid-state imaging device of Example 2 according to the present invention. FIG. 4A is a block diagram showing the configuration of the solid-state imaging device, and FIG. 4B is a graph showing a waveform for illustrating the operation thereof.

In FIG. 4A, a solid-state imaging device 120 of Example 2 includes an pulse-amplitude modulation circuit 123b provided instead of the second pulse-amplitude modulation circuit 103b in the solid-state imaging device 100 of Example 1, a detection circuit 121, and a control voltage generation circuit 122. The pulse-amplitude modulation circuit 123b adjusts the amplification level of the pulse amplitude of the anterior shutter pulse train Φs2' for each field period based on a predetermined control voltage. The detection circuit 121 detects the leak of charges from the photodiode to the vertical CCD 2 based on the output signal of the CCD section 201. The control voltage generation circuit 122 generates the control voltage based on the output of the detection circuit 121. The other components are the same as those of the solid-state imaging device 100 of Example 1, and are denoted by the same reference numerals.

The detection circuit 121 includes a first storage section 121a and a second storage section 121b, each being capable of accumulating the output signal of the CCD section 201 for one field. The first storage section 121a is constituted so as to store the signal output from the CCD section 201 for each field and to output the output signal of the CCD section 201 accumulated in a previous field period to the second storage section 121b. The second storage section 121b is constituted so that the output signal from the first storage section 121a is stored for each field period.

The detection circuit 121 includes a comparison circuit 121c for comparing the average level of output signals accumulated in the first storage section 121a with the average level of output signals accumulated in the second storage section 121b for each field period. The detection circuit 121 supplies the control voltage generation circuit 122 with a comparison result signal indicating that the number of output signals from the CCD section 201 increases, decreases or remains unchanged.

The control voltage generation circuit 122 receives the comparison result signal. In the case where the number of output signals of the CCD section 201 tends to increase as compared with the previous field, the pulse amplitude of the anterior shutter pulse train is amplified by increasing the control voltage $V_{s2}$ by a certain amount. On the other hand, in the case where the number of output signals of the CCD section 201 tends to decrease or remain unchanged as compared with the previous field, the pulse amplitude of the anterior shutter pulse train is diminished by decreasing the control voltage $V_{s2}$ by a certain amount. In the control voltage generation circuit 122, an output voltage at the initial stage of operation is set at the maximum level $V_{MAX}$ that is, the same level as the voltage level $V_{s1}$ serving as the pulse amplitude of the final shutter pulse Φs1'. The control voltage $V_{s2}$ is started to be adjusted from the maximum level $V_{MAX}$. In FIG. 4B, $O_s$ is an average level of the output signals of the CCD section 201, $P_1$ is a point where the average level of the output signal changes when the control voltage is gradually lowered, $O_{s1}$ is an average level of the output signals of the CCD section 201 at the point $P_1$, and $V_1$ is a level of the control voltage at the point $P_1$.

Next, the function and effect will be described.

In the solid-state imaging device 120 of Example 2 having the aforementioned configuration, the generation of the base pulse train Φs for electronic shutter, the separation of the base pulse Φs into the final base pulse Φs1 and the anterior base pulse train Φs2, the combination of the final shutter pulse Φs1' and the anterior shutter pulse train Φs2' obtained by amplifying their amplitudes after separation, and the application of the composite shutter pulse Φs' are performed in a similar manner to those of Example 1.

In Example 2, when the shutter pulse Φs' is applied, the amplitude level of the anterior shutter pulse Φs2' is set in the second pulse-amplitude modulation circuit 123b based on the output signal of the CCD section 201.

More specifically, since the initial value of the control voltage serving as the output is set at the maximum level $V_{MAX}$ in the control voltage generation circuit 122, the amplitude level of the anterior shutter pulse train Φs2' is high as the amplitude level of the final shutter pulse Φs1' immediately after the initiation of operation. Therefore, until several field periods elapse immediately after the initiation of operation, the pulse amplitude of the anterior shutter pulse train Φs2' is maintained at a high level. Accordingly, the charges accumulated in the photodiode do not leak out to the vertical CCD. Thus, the comparison result that the average value of the output signal of the CCD section remains unchanged as compared with the previous field is obtained in the comparison circuit 121c. Then, the control voltage generation circuit 122 lowers the level of the control voltage $V_{s2}$ by a certain amount for each field period. Φs a result, from the application of the read pulse to the application of the final shutter pulse Φs1' to the substrate in one field period, the amount of charges accumulated in the photodiode gradually increases. At last, the charges leak out from the photodiode to the vertical CCD section. At this time, the level of the control voltage $V_{s2}$ is $V_1$ (see FIG. 4B).

Then, the comparison circuit 121c outputs the comparison result signal indicating that the average value of the output signals from the CCD section 201 increases as compared with the previous field. The control voltage generation circuit 122 increases the level of the control voltage $V_{s2}$ serving as an output thereof by a certain amount based on the comparison result signal.

In this way, if the comparison circuit 121c outputs the comparison result signal indicating that the average value of the output signal of the CCD section decreases or remain unchanged as compared with the previous field in a next field period, the control voltage generation circuit 122 lowers the level of the control voltage $V_{s2}$ by a certain amount based on the comparison result signal. On the other hand, the comparison circuit 121c outputs the comparison result signal indicating that the amount of leaking charges increases, the control voltage generation circuit 122 raises the level of the control voltage Vs2 serving as an output by a certain amount. The control voltage generation circuit 122 adjusts the level of the control voltage every time.

The amplitude level $V_{s2}$ of the anterior shutter pulse train Φs2' is held at such a level that the accumulated charges are almost prevented from leaking out from the photodiode.

In the solid-state imaging device of Example 2 having such a configuration, the amount of accumulated charges leaking from the photodiode toward the charge transfer section is detected. Based on the output of the detection circuit, the pulse amplitude of the anterior shutter pulse train Φs2' is controlled so that the charges accumulated in the photodiode do not leak toward the charge transfer section. Therefore, even if the amount of incident light from a subject is increased or decreased, the charges are almost prevented from leaking from the photodiode toward the charge transfer section.

In Example 2, the amount of leaking charges is detected. Then, the pulse amplitude of the anterior shutter pulse train Φs2' is adjusted so that the amount of leaking charges becomes zero, whereby the minimum value thereof is determined. Besides the adjustment of the amplitude level of the anterior shutter pulse train Φs2', the amount of leaking charges can be also limited by increasing the number of pulses having such a high pulse amplitude that all the charges accumulated in the photodiode are allowed to flow.

EXAMPLE 3

Figure 5A:
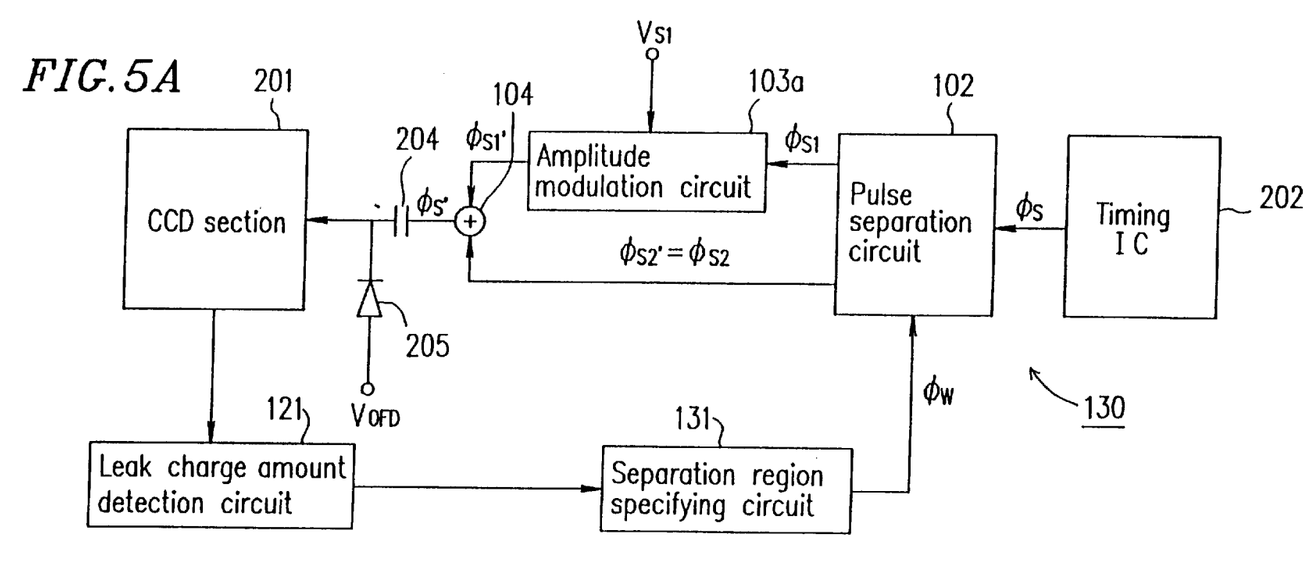
FIG. 5A is a block diagram showing the configuration of the solid-state imaging device of Example 3.
Figure 5B:
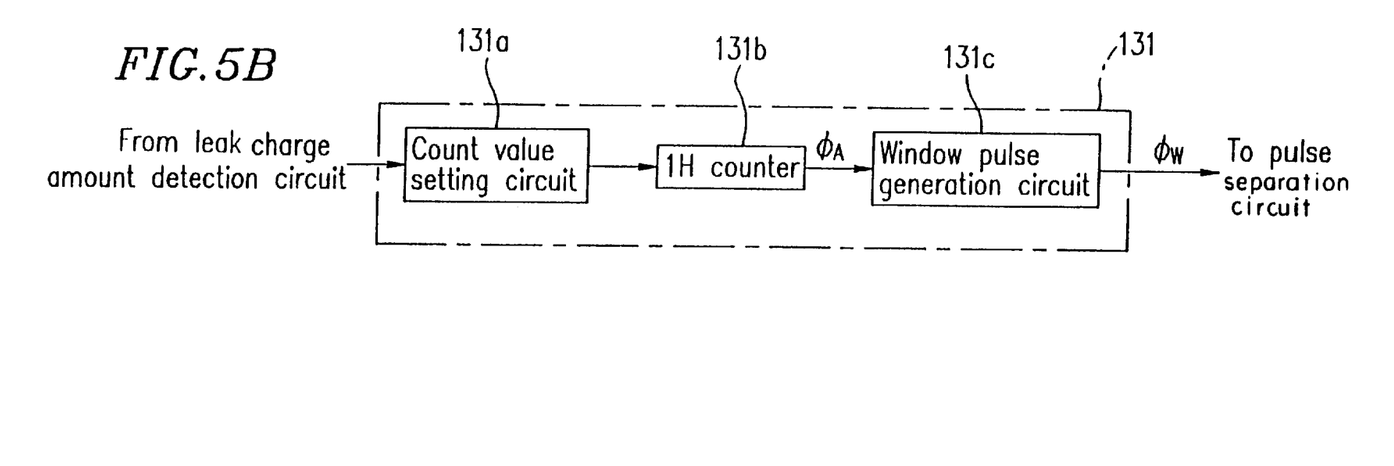
FIG. 5B is a block diagram showing the detailed configuration of a separation region specifying circuit in the solid-state imaging device.

FIGS. 5A and 5B illustrate a solid-state imaging device of Example 3 according to the present invention. FIG. 5A is a block diagram showing the configuration of the solid-state imaging device, and FIG. 5B is a block diagram showing the configuration of a separation region specifying circuit in the solid-state imaging device.

In FIG. 5A, the same components as those in FIG. 4A are denoted by the same reference numerals of the solid-state imaging device 120 of Example 2. A solid-state imaging device 130 of Example 3 includes a separation region specifying circuit 131 for generating a window pulse (position specifying signal) Φw specifying the boundary position between an anterior pulse train and a posterior pulse train obtained by separating a pulse train Φs for electronic shutter based on the output of the detection circuit 121, instead of the control voltage generation circuit 122 of the solid-state imaging device 120 of Example 2. In the pulse separation circuit 102, the number of pulses of the anterior base pulse train Φs2 separated from the pulse train Φs for electronic shutter is determined so that the charges accumulated in the photodiode do not leak toward the charge transfer section.

In the solid-state imaging device 130 of Example 3, the posterior base pulse train Φs1 which is subjected to an amplitude modulation process by the pulse-amplitude modulation circuit 103a, that is, the posterior shutter pulse train Φs1', and the anterior base pulse train Φs2 are combined without converting the amplitude of the anterior base pulse train Φs2.

Figure 6:
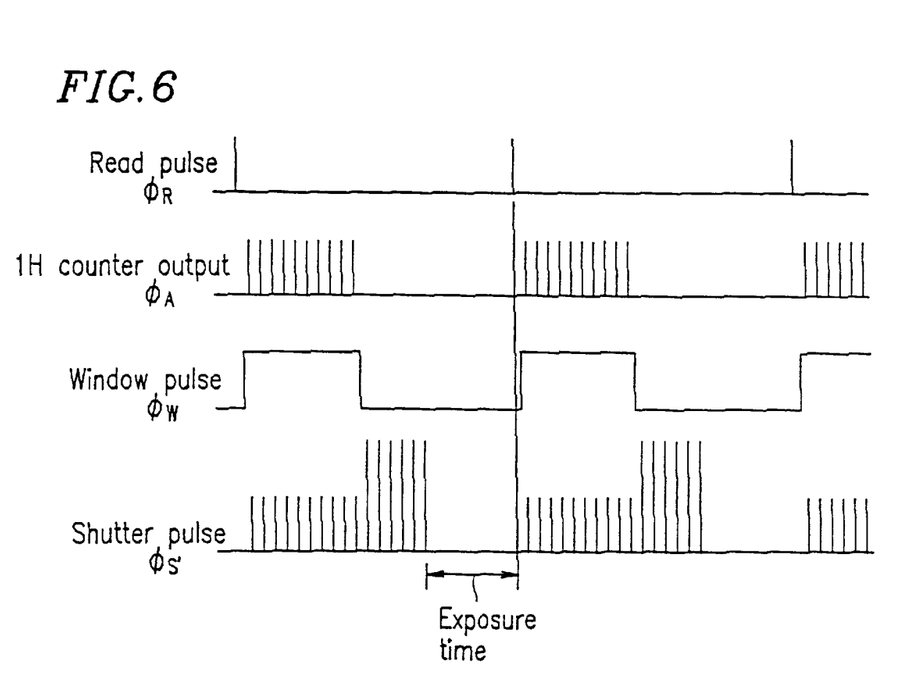
FIG. 6 is a timing chart for illustrating the operation of the solid-state imaging device of Example 3 of the present invention.

The separation region specifying circuit 131 includes a count value setting circuit 131a, a 1H counter 131b, and a window pulse generation circuit 131c. The count value setting circuit 131a receives the comparison result signal to determine a count value. The 1H counter 131b generates the number of pulses corresponding to the count value set by the count value setting circuit 131a at pulse intervals in one horizontal period immediately after the initiation of one field period. The window pulse generation circuit 131c receives an output ΦA of the 1H counter 131b so as to output a window pulse Φw having a high signal level, only for the period in which pulses are subsequently output from the 1H counter 131b. FIG. 6 is a timing chart showing the output ΦA of the 1H counter 131b, the output Φw of the window pulse generation circuit 131c, and the shutter pulse train Φs' applied onto the substrate of the CCD section 201.

In the case where the number of output signals of the CCD section 201 tends to increase as compared with the previous field, the count value setting circuit 131a decreases the count number of the 1H counter 131b by one. On the other hand, in the case where the number of output signals of the CCD section 201 tends to decrease or remain unchanged as compared with the previous field, the count value setting circuit 131a increases the count number of the 1H counter 131b by one. In the count value setting circuit 131a, the count value, at which the number of output pulses of the 1H counter 131b becomes zero, is set as an initial value. The count value is decreased or increased from this count value.

The amplitude $V_{s2}$ of the anterior pulse train Φs2' of the shutter pulse train Φs' applied to the substrate of the CCD section for one field period is set to be equal to, for example, the power source potential supplied to the timing IC 202, i.e., 5 V. The amplitude of the posterior pulse train Φs1' is set at such a level that all of the charges accumulated in the photodiode are allowed to flow. In Example 3, the timing IC 202 has the same configuration as that of the timing IC in the conventional solid-state imaging device 200 shown in FIG. 7.

In the solid-state imaging device 130 of Example 3 having the aforementioned configuration, when the base pulse train Φs for electronic shutter generated in the timing IC 202 is supplied to the pulse separation circuit 102, the pulse separation circuit 102 separates the base pulse train Φs into the posterior base pulse train Φs1 including the final pulse and the remaining anterior base pulse train Φs2 based on the window pulse Φw output from the separation region specifying circuit 131.

Then, the amplitudes of pulses of the thus separated posterior base pulse train Φs1 are amplified to the amplitude level $V_{s1}$ by an amplitude modulation process in the pulse-amplitude modulation circuit 103a. Φs a result, the posterior base pulse train Φs1 serves as the posterior shutter pulse train Φs1'. Since the anterior base pulse train Φs2' is not subjected to an amplitude modulation process in Example 3, the posterior shutter pulse train Φs1' is combined with the anterior base pulse Φs2 having unchanged amplitude level supplied from the timing IC 202. Φs a result of this, the composite shutter pulse Φs' is obtained, and applied to the substrate of the CCD section 201.

In Example 3, when the composite shutter pulse Φs' is applied, the position at which the base pulse Φs for electronic shutter output from the timing IC 202 is separated into the anterior part and the posterior part is determined by the leak charge amount detection circuit 121 and the separation region specifying circuit 131 based on the output signal from the CCD section 201.

More specifically, since the initial value of the count value serving as the output of the count value setting circuit 131a of the separation region specifying circuit 131 is set at such a value that the number of output pulses of the 1H counter 131b is zero, no pulse is output from the 1H counter 131b immediately after the initiation of operation. The pulse separation circuit 102 outputs the entire base pulse train Φs as the posterior base pulse train Φs1 including the final pulse to the pulse-amplitude modulation circuit 103a.

Thus, until several field periods elapse immediately after the initiation of operation, a few of the number of shutter pulses are included in the anterior shutter pulse train Φs2'. Therefore, the charges accumulated in the photodiode do not leak toward the vertical CCD. Accordingly, the comparison result that the average value of the output signal from the CCD section remains unchanged as compared with the previous field is obtained in the comparison circuit 121c included in the leak charge amount detection circuit 121. Then, the count value setting circuit 131a increases the count value serving as the output of the comparison circuit 121c by one for each field period. By this operation, the number of pulses output from the 1H counter 131b within one field period increases. Specifically, the amount of charges accumulated in the photodiode gradually increases from the application of the read pulse to the application of the final pulse of the shutter pulse train Φs' onto the substrate. At last, the charges leak out from the photodiode to the vertical CCD section.

Then, the comparison circuit 121c outputs a comparison result signal indicating that the average value of the output signal from the CCD section increases as compared with the previous field. Based on the comparison result signal, the count value setting circuit 131a decreases the count value only by one.

In the next field period, if the comparison circuit 121c outputs the comparison result signal indicating that the average value of the output signal from the CCD section decreases or remains unchanged as compared with the previous field, the count value setting circuit 131a increases the count value serving as the output only by one, based on the comparison result signal. On the other hand, if the comparison result signal indicating that the amount of leaking charges increases is obtained, the count value setting circuit 131a decreases the count value. In this manner, the count value setting circuit 131a adjusts the count value as described above.

By the above operation, the number of pulses included in the anterior shutter pulse train Φs2' is held at such a value that the charges accumulated in the photodiode are almost prevented from leaking.

As described above, since the pulse amplitude of the anterior pulse train obtained from the pulse separation circuit 102 is not amplified in Example 3, the pulse-amplitude modulation circuit and a power source for amplitude conversion are not required. Moreover, the amount of accumulated charges leaking from the photodiode to the charge transfer section is detected. Based on the result of detection, the boundary between the anterior pulse train and the posterior pulse train separated from the shutter pulse train is specified. Therefore, even if the amount of incident light from a subject is increased or decreased, the charges are almost prevented from leaking from the photodiode to the charge transfer section.

As described above, according to the solid-state imaging device of the present invention, a shutter pulse train applied to the substrate so as to allow the charges accumulated in each photodiode to flow toward the substrate side is separated into an anterior pulse train and a posterior pulse train including the final pulse. The pulse amplitude of the anterior pulse train is set so as to be smaller than that of the posterior pulse train. Thus, the increase in the power consumption due to the electronic shutter operation can be restrained while restraining the charges generated in the light-receiving portions from leaking out toward the vertical CCD side.

For example, all of the shutter pulse amplitudes are not set at a high voltage level, that is, the amplitude of only the final shutter pulse is set at a high voltage level while the amplitude of the other pulses is set at a level as low as possible. As a result, the power consumed by the electronic shutter operation can be remarkably reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A solid-state imaging device comprising:
a plurality of photodiodes arranged on a surface of a semiconductor substrate, for generating charges in response to light irradiation and for temporarily holding the charges;
a charge transfer section for receiving the charges accumulated in each of the plurality photodiodes in response to a read pulse supplied in a certain cycle and for transferring the charges in response to a transfer signal;
a shutter pulse application section for applying an electronic shutter pulse train, which allows the charges accumulated in each of the plurality of photodiodes to flow toward the substrate, onto the substrates;
wherein the shutter pulse application section includes a circuit for changing a pulse amplitude of the electronic shutter pulse train in the certain pulse;
wherein the electronic shutter pulse train having at least two different pulse amplitudes in the certain cycle is applied onto the substrate.

2. A solid-state imaging device comprising:
a plurality of photodiodes arranged on a surface of a semiconductor substrate, for generating charges in response to light irradiation and for temporarily holding the charges;
a charge transfer section for receiving the charges accumulated in each of the plurality photodiodes in response to a read pulse supplied in a certain cycle and for transferring the charges in response to a transfer signal;
a shutter pulse application section for applying an electronic shutter pulse train, which allows the charges accumulated in each of the plurality of photodiodes to flow toward the substrate, onto the substrate;
wherein the shutter pulse application section includes a circuit for changing a pulse amplitude of the electronic shutter pulse train in the certain pulse; and
wherein the electronic shutter pulse train includes a posterior pulse train including at least a final pulse and an anterior pulse train other than the posterior pulse train, and a pulse amplitude of the anterior pulse train is determined so as to be smaller than that of the posterior pulse train.

3. A solid-state imaging device according to claim 2, wherein the pulse amplitude of the posterior pulse train has such a level that almost all of the charges accumulated in each of the plurality of photodiodes are caused to flow toward the substrate, and
wherein the pulse amplitude of the anterior pulse train has such a level that the charges accumulated in each of the plurality of photodiodes do not leak toward the charge transfer section.

4. A solid-state imaging device according to claim 3, comprising:
a pulse generation circuit for generating a base pulse train having a certain amplitude at predetermined timing; and
a signal processing circuit for receiving the base pulse train from the pulse generation circuit and for amplifying the base pulse train with at least two amplification factors to form the anterior pulse train and the posterior pulse train.

5. A solid-state imaging device comprising:
a plurality of photodiodes arranged on a surface of a semiconductor substrate, for generating charges in response to light irradiation and for temporarily holding the charges;
a charge transfer section for receiving the charges accumulated in each of the plurality of photodiodes in response to a read pulse supplied in a certain cycle and for transferring the charges in response to a transfer signal; and a shutter pulse application section for applying an electronic shutter pulse train, which allows the charges accumulated in each of the plurality of photodiodes to flow toward the substrate, onto the substrate, wherein the shutter pulse application section includes:

a pulse generation circuit for generating a base pulse train having a certain amplitude at predetermined timing;

a pulse separation circuit for receiving the base pulse train from the pulse generation circuit and for separating the base pulse train into a posterior pulse train including at least a final pulse and an anterior pulse train other than the posterior pulse train;

an amplitude modulation circuit for receiving the posterior pulse train and the anterior pulse train output from the pulse separation circuit and for performing signal processing so that a pulse amplitude of the posterior pulse train is greater than the that of the anterior pulse train; and a pulse synthesizing circuit for combining the posterior pulse train and the anterior pulse train output from the amplitude modulation circuit, wherein an output of the pulse synthesizing circuit is applied onto the substrate as the electronic shutter pulse train.

6. A solid-state imaging device according to claim 5, wherein the amplitude modulation circuit modulates the pulse amplitude of the posterior pulse train to such a level that almost all of the charges accumulated in each of the plurality of photodiodes are allowed to flow toward the substrate, and modulates the pulse amplitude of the anterior pulse train to such a level that the charges accumulated in each of the plurality of photodiodes do not leak toward the charge transfer section.

7. A solid-state imaging device according to claim 6, wherein the amplitude modulation circuit includes a first amplification circuit for amplifying the pulse amplitude of the posterior pulse train to a certain level and a second amplification circuit for determining the pulse amplitude of the anterior pulse train for every certain cycle based on a control signal, the solid-state imaging device further comprising:

a detection circuit for detecting the amount of charges overflowing from the photodiodes to the charge transfer section, based on a change in a level of an output signal of the charge transfer section; and a control signal generation circuit for generating the control signal based on an output of the detection circuit and for supplying the control signal to the second amplification circuit, thereby determining the pulse amplitude of the anterior pulse train so that the charges do not overflow from the photodiodes to the charge transfer section.

8. A solid-state imaging device according to claim 6, wherein the amplitude modulation circuit includes an amplification circuit for selectively amplifying the pulse amplitude of the posterior pulse train, the solidstate imaging device further comprising:

a detection circuit for detecting the amount of charges overflowing from the photodiodes to the charge transfer section, based on a change in a level of an output signal of the charge transfer section; and a separation region specifying circuit for generating a separation position specifying signal based on the output of the detection circuit, which specifies a boundary position between the anterior pulse train and the posterior pulse train so that the charges do not overflow from the photodiodes to the charge transfer section, and for supplying the separation position specifying signal to the pulse separation circuit.

9. A solid-state imaging device according to claim 7, wherein the detection circuit includes:

a storage circuit for storing a first signal and a second signal output from the charge transfer section, the first signal corresponding to the charges read out by a certain read pulse and the second signal corresponding to the charges read out by a read pulse subsequent to the certain read pulse; and a comparison circuit for comparing the first signal and the second signal stored in the storage circuit.

10. A solid-state imaging device according to claim 8, wherein the detection circuit includes:

a storage circuit for storing a first signal and a second signal output from the charge transfer section, the first signal corresponding to the charges read out by a certain read pulse and the second signal corresponding to the charges read out by a read pulse subsequent to the certain read pulse; and a comparison circuit for comparing the first signal and the second signal stored in the storage circuit.

\* \* \* \* \*